United States Patent
Hamaoka

(10) Patent No.: US 11,427,033 B2
(45) Date of Patent: Aug. 30, 2022

(54) TIRE

(71) Applicant: SUMITOMO RUBBER INDUSTRIES, LTD., Hyogo (JP)

(72) Inventor: Kanako Hamaoka, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 254 days.

(21) Appl. No.: 16/743,057

(22) Filed: Jan. 15, 2020

(65) Prior Publication Data

US 2020/0238766 A1    Jul. 30, 2020

(30) Foreign Application Priority Data

Jan. 25, 2019 (JP) .............................. JP2019-011513

(51) Int. Cl.
   *B60C 11/12*    (2006.01)
   *B60C 11/03*    (2006.01)

(52) U.S. Cl.
   CPC ...... *B60C 11/0304* (2013.01); *B60C 11/1218* (2013.01); *B60C 11/1236* (2013.01); *B60C 11/1281* (2013.01)

(58) Field of Classification Search
   CPC . B60C 11/0304; B60C 11/12; B60C 11/1218; B60C 11/1236; B60C 11/1281
   See application file for complete search history.

(56) References Cited

U.S. PATENT DOCUMENTS

2010/0116393 A1*  5/2010  Miyazaki  ............  B60C 11/1263
                                              152/209.18

2012/0222788 A1*  9/2012  Nishiwaki  ...............  B60C 11/12
                                              152/209.18

(Continued)

FOREIGN PATENT DOCUMENTS

EP    2610086 A1    7/2013
EP    3153334 A1    4/2017

(Continued)

OTHER PUBLICATIONS

European Search Report, European Patent Office, Application No. 20152091.3, dated Jul. 6, 2020.

*Primary Examiner* — Cedrick S Williams
(74) *Attorney, Agent, or Firm* — Greenblum & Bernstein, P.L.C.

(57) ABSTRACT

A tire having an outer middle land portion demarcated between an outer shoulder circumferential groove and an outer crown circumferential groove and located at an outer side of a vehicle when the tire is mounted on the vehicle, and an inner middle land portion demarcated between an inner shoulder circumferential groove and an inner crown circumferential groove and located at an inner side of the vehicle when the tire is mounted on the vehicle formed in a tread portion. The outer middle land portion has first outer middle sipes extending from the outer crown circumferential groove toward the outer shoulder circumferential groove and terminating within the outer middle land portion. The inner middle land portion has first inner middle sipes extending from the inner shoulder circumferential groove toward the inner crown circumferential groove and terminating within the inner middle land portion. An angle $\theta 1$ of each first outer middle sipe with respect to a tire axial direction is smaller than an angle $\theta 2$ of each first inner middle sipe with respect to the tire axial direction.

18 Claims, 6 Drawing Sheets

(56) References Cited

U.S. PATENT DOCUMENTS

2013/0167994 A1* 7/2013 Hada .................. B60C 11/032
                                                                             152/209.8
2021/0252916 A1* 8/2021 Weber ................ B60C 11/0008

FOREIGN PATENT DOCUMENTS

| EP | 3199378 A1 | | 8/2017 |
|----|-----------|---|--------|
| EP | 3208111 A1 | | 8/2017 |
| EP | 3326840 A1 | | 5/2018 |
| JP | 2015134575 A | * | 7/2015 |
| JP | 2015209189 A | | 11/2015 |
| JP | 2017-128269 | | 7/2017 |

* cited by examiner

TIRE

BACKGROUND OF THE INVENTION

Field of the Invention

The present invention relates to a tire capable of achieving both steering stability and ride comfort.

Description of the Background Art

Hitherto, tires for which an attempt to achieve a plurality of performances required for tires is made, have been known. For example, Japanese Laid-Open Patent Publication No. 2017-128269 proposes a pneumatic tire for which an attempt to achieve both steering stability and ride comfort is made by specifying the lengths of shoulder lug grooves and the lengths of shoulder sipes.

However, when the pneumatic tire of Japanese Laid-Open Patent Publication No. 2017-128269 is mounted on a vehicle, there is no stiffness difference in the pneumatic tire between the outer side and the inner side of the vehicle, and thus self-aligning torque is not generated, so that a response delay may occur upon steering. Thus, further improvement is required for achievement of both steering stability and ride comfort.

SUMMARY OF THE INVENTION

The present invention has been made in view of the above circumstances, and a main object of the present invention is to provide a tire that basically has a tread portion with an asymmetric pattern and that is capable of achieving both steering stability and ride comfort.

The present invention is directed to a tire including a tread portion having a designated mounting direction to a vehicle, wherein: an outer middle land portion that is demarcated between an outer shoulder circumferential groove and an outer crown circumferential groove and that is located at an outer side of the vehicle when the tire is mounted on the vehicle, and an inner middle land portion that is demarcated between an inner shoulder circumferential groove and an inner crown circumferential groove and that is located at an inner side of the vehicle when the tire is mounted on the vehicle, are formed in the tread portion; the outer middle land portion has first outer middle sipes that extend from the outer crown circumferential groove toward the outer shoulder circumferential groove and that terminate within the outer middle land portion; the inner middle land portion has first inner middle sipes that extend from the inner shoulder circumferential groove toward the inner crown circumferential groove and that terminate within the inner middle land portion; and an angle of each of the first outer middle sipes with respect to a tire axial direction is smaller than an angle of each of the first inner middle sipes with respect to the tire axial direction.

In the tire according to the present invention, preferably, the angle of each of the first outer middle sipes is 5 to 15°, and the angle of each of the first inner middle sipes is 15 to 25°.

In the tire according to the present invention, a direction in which each of the first outer middle sipes is tilted relative to the tire axial direction, and a direction in which each of the first inner middle sipes is tilted relative to the tire axial direction, are preferably opposite to each other.

In the tire according to the present invention, the total number of the first outer middle sipes in a tire circumferential direction is preferably smaller than the total number of the first inner middle sipes in the tire circumferential direction.

In the tire according to the present invention, preferably, the total number of the first outer middle sipes is 60 to 70, and the total number of the first inner middle sipes is 70 to 80.

In the tire according to the present invention, the difference between the total number of the first outer middle sipes and the total number of the first inner middle sipes is preferably 5 to 15.

In the tire according to the present invention, preferably, an outer shoulder land portion demarcated between the outer shoulder circumferential groove and an outer tread edge and an inner shoulder land portion demarcated between the inner shoulder circumferential groove and an inner tread edge are formed in the tread portion, and the outer shoulder land portion has a width in the tire axial direction larger than that of the inner shoulder land portion.

In the tire according to the present invention, preferably, the width of the outer shoulder land portion is 15% to 25% of a tread width, and the width of the inner shoulder land portion is 10% to 20% of the tread width.

In the tire according to the present invention, preferably, the outer shoulder land portion has outer shoulder sipes that extend from the outer shoulder circumferential groove toward the outer tread edge and that terminate within the outer shoulder land portion, the inner shoulder land portion has inner shoulder sipes that extend from the inner shoulder circumferential groove toward the inner tread edge and that terminate within the inner shoulder land portion, and each of the outer shoulder sipes has a length in the tire axial direction smaller than that of each of the inner shoulder sipes.

In the tire according to the present invention, preferably, the length of each of the outer shoulder sipes is 20% to 40% of the width of the outer shoulder land portion, and the length of each of the inner shoulder sipes is 50% to 70% of the width of the inner shoulder land portion.

In the tire according to the present invention, each of the outer middle land portion, the inner middle land portion, the outer shoulder land portion, and the inner shoulder land portion is preferably continuous in a tire circumferential direction.

In the tire according to the present invention, preferably, a crown land portion demarcated between the outer crown circumferential groove and the inner crown circumferential groove is formed in the tread portion, the crown land portion has inner crown sipes that extend from the inner crown circumferential groove toward a tire equator and that terminate within the crown land portion, the inner middle land portion has second inner middle sipes that extend from the inner crown circumferential groove toward the inner shoulder circumferential groove and that terminate within the inner middle land portion, and each of the inner crown sipes and each of the second inner middle sipes are located so as to form a straight line across the inner crown circumferential groove.

In the tire according to the present invention, the outer middle land portion has first outer middle sipes that extend from the outer crown circumferential groove toward the outer shoulder circumferential groove and that terminate within the outer middle land portion, and the inner middle land portion has first inner middle sipes that extend from the inner shoulder circumferential groove toward the inner crown circumferential groove and that terminate within the inner middle land portion. Such first outer middle sipes and such first inner middle sipes can reduce the stiffness of the outer middle land portion and the stiffness of the inner middle land portion, respectively, to improve the ride comfort of the tire.

In the tire according to the present invention, the angle of each of the first outer middle sipes with respect to the tire axial direction is smaller than the angle of each of the first inner middle sipes with respect to the tire axial direction. With such an outer middle land portion and such an inner middle land portion, the stiffness of the outer middle land portion is higher than the stiffness of the inner middle land portion, and thus self-aligning torque can be generated in the tire. Therefore, the tire can improve responsiveness when the tire is steered, and the steering stability of the tire can be improved. Accordingly, the tire according to the present invention can achieve both steering stability and ride comfort at high levels.

DESCRIPTION OF THE PREFERRED EMBODIMENTS

Hereinafter, an embodiment of the present invention will be described in detail with reference to the drawings.

Figure 1:
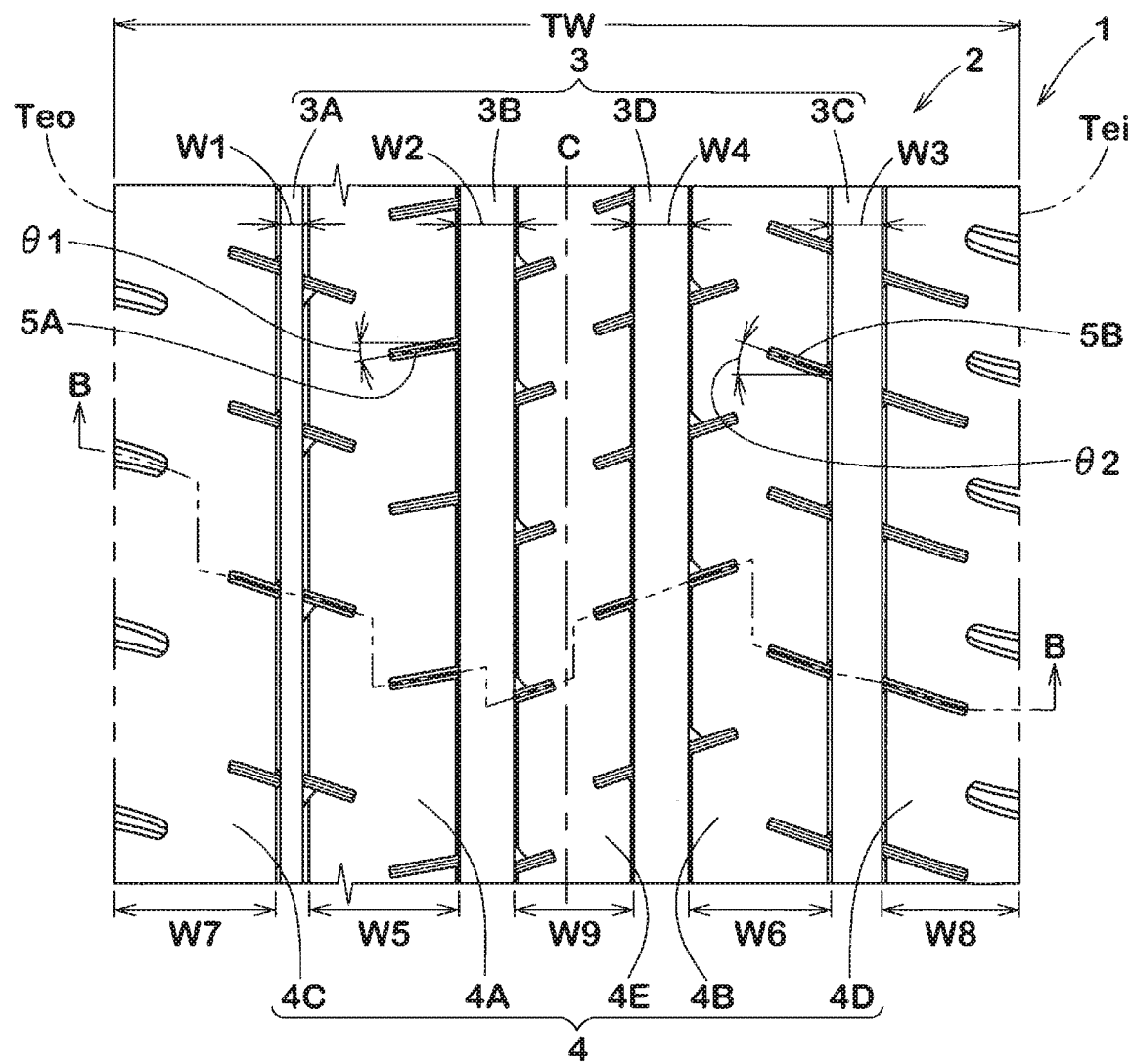
FIG. 1 is a development showing an embodiment of the tread portion of the tire according to the present invention.

FIG. 1 is a development showing a tread portion 2 of a tire 1 according to the present embodiment. As shown in FIG. 1, the tire 1 according to the present embodiment has the tread portion 2 that has an asymmetric tread pattern and that has a designated mounting direction to a vehicle. The designated mounting direction to a vehicle is indicated, for example, on a sidewall portion (not shown) by characters or symbols.

The tire 1 is suitably used as, for example, a pneumatic tire for a passenger car. The tire 1 is not limited to a pneumatic tire for a passenger car, and can be used as, for example, various tires such as a heavy-duty pneumatic tire and a non-pneumatic tire the interior of which is not filled with pressurized air.

The tread portion 2 of the present embodiment has an outer tread edge Teo located at the outer side of the vehicle with respect to a tire equator C when the tire 1 is mounted on the vehicle, and an inner tread edge Tei located at the inner side of the vehicle with respect to the tire equator C when the tire 1 is mounted on the vehicle.

Here, the "outer tread edge Teo" and the "inner tread edge Tei" are each a ground contact position at the outermost side in the tire axial direction when a normal load is applied to the tire 1 in a normal state and the tire 1 is brought into contact with a flat surface at a camber angle of 0°. The center position in the tire axial direction between the outer tread edge Teo and the inner tread edge Tei corresponds to the tire equator C. In addition, the distance in the tire axial direction between the outer tread edge Teo and the inner tread edge Tei is a tread width TW.

In the case where the tire 1 is a pneumatic tire, the "normal state" is a state where: the tire 1 is mounted to a normal rim and adjusted to a normal internal pressure; and no load is applied to the tire 1. In the present specifications, unless otherwise specified, dimensions and the like of components of the tire 1 are values measured in the normal state.

The "normal rim" is a rim that is defined, in a standard system including a standard on which the tire 1 is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire 1 is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire 1 is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 preferably has a plurality of circumferential grooves 3 continuously extending in the tire circumferential direction, and a plurality of land portions 4 demarcated by the circumferential grooves 3. Each of the plurality of land portions 4 of the present embodiment has no grooves and sipes continuously extending in the tire circumferential direction, and no grooves and sipes traversing the land portion 4 in the tire axial direction. Such land portions 4 have high stiffness and can improve the steering stability of the tire 1. In the present specification, a sipe has opposing wall surfaces that come into contact with each other when coming into contact with the ground, and a groove has a gap between opposing wall surfaces that oppose each other even when coming into contact with the ground.

The circumferential grooves 3 of the present embodiment include an outer shoulder circumferential groove 3A provided along the outer tread edge Teo at the outer tread edge Teo side with respect to the tire equator C, and an outer crown circumferential groove 3B provided between the outer shoulder circumferential groove 3A and the tire equator C. In addition, the circumferential grooves 3 of the present embodiment include an inner shoulder circumferential groove 3C provided along the inner tread edge Tei at the inner tread edge Tei side with respect to the tire equator C, and an inner crown circumferential groove 3D provided between the inner shoulder circumferential groove 3C and the tire equator C.

The land portions 4 of the present embodiment include an outer middle land portion 4A demarcated between the outer shoulder circumferential groove 3A and the outer crown circumferential groove 3B, and an inner middle land portion 4B demarcated between the inner shoulder circumferential groove 3C and the inner crown circumferential groove 3D. Thus, the outer middle land portion 4A located at the outer side of the vehicle when the tire 1 is mounted on the vehicle, and the inner middle land portion 4B located at the inner side of the vehicle when the tire 1 is mounted on the vehicle, are formed in the tread portion 2 of the present embodiment.

The outer middle land portion 4A preferably has first outer middle sipes 5A that extend from the outer crown circumferential groove 3B toward the outer shoulder circumferential groove 3A and that terminate within the outer middle land portion 4A. Such first outer middle sipes 5A can reduce the stiffness of the outer middle land portion 4A to improve the ride comfort of the tire 1.

The inner middle land portion 4B preferably has first inner middle sipes 5B that extend from the inner shoulder circumferential groove 3C toward the inner crown circumferential groove 3D and that terminate within the inner middle land portion 4B. Such first inner middle sipes 5B can reduce the stiffness of the inner middle land portion 4B to improve the ride comfort of the tire 1.

The angle $\theta 1$ of each first outer middle sipe 5A of the present embodiment with respect to the tire axial direction is smaller than the angle $\theta 2$ of each first inner middle sipe 5B with respect to the tire axial direction. With such an outer middle land portion 4A and such an inner middle land portion 4B, the stiffness of the outer middle land portion 4A is higher than the stiffness of the inner middle land portion 4B, and thus self-aligning torque can be generated in the tire 1. Therefore, the tire 1 according to the present embodiment can improve responsiveness when the tire 1 is steered, and thus the steering stability of the tire 1 can be improved. Accordingly, the tire 1 according to the present embodiment can achieve both steering stability and ride comfort at high levels.

As a more preferable mode, the circumferential grooves 3 each continuously extend in the tire circumferential direction in a straight manner. The groove width W1 of the outer shoulder circumferential groove 3A of the present embodiment is smaller than the groove width W2 of the outer crown circumferential groove 3B. The groove width W1 of the outer shoulder circumferential groove 3A is preferably the smallest among the circumferential grooves 3. Such an outer shoulder circumferential groove 3A can enhance the stiffness at the outer side of the vehicle when the tire 1 is mounted on the vehicle, to allow self-aligning torque to be generated in the tire 1. Thus, the steering stability of the tire 1 can be improved.

The groove width W3 of the inner shoulder circumferential groove 3C is preferably substantially equal to or slightly smaller than the groove width W4 of the inner crown circumferential groove 3D. The groove width W4 of the inner crown circumferential groove 3D is preferably substantially equal to the groove width W2 of the outer crown circumferential groove 3B. Such a circumferential groove 3 can exhibit excellent drainage performance to improve the wet performance of the tire 1.

The land portions 4 of the present embodiment include an outer shoulder land portion 4C demarcated between the outer shoulder circumferential groove 3A and the outer tread edge Teo, and an inner shoulder land portion 4D demarcated between the inner shoulder circumferential groove 3C and the inner tread edge Tei. The land portions 4 preferably further include a crown land portion 4E demarcated between the outer crown circumferential groove 3B and the inner crown circumferential groove 3D.

Therefore, in the tread portion 2 of the present embodiment, the outer shoulder land portion 4C, the outer middle land portion 4A, the crown land portion 4E, the inner middle land portion 4B, and the inner shoulder land portion 4D are formed in this order from the outer side of the vehicle when the tire 1 is mounted on the vehicle.

The width W5 in the tire axial direction of the outer middle land portion 4A is preferably larger than the width W6 in the tire axial direction of the inner middle land portion 4B. Such an outer middle land portion 4A has higher stiffness than the inner middle land portion 4B, and allows the self-aligning torque of the tire 1 to be generated more strongly. Thus, the steering stability of the tire 1 of the present embodiment can be further improved.

The width W5 of the outer middle land portion 4A is preferably 15% to 25% of the tread width TW. If the width W5 is less than 15% of the tread width TW, the stiffness of the outer middle land portion 4A is decreased, so that the effect of improving the steering stability of the tire 1 may be reduced. If the width W5 is greater than 25% of the tread width TW, the stiffness of the outer middle land portion 4A is excessively increased, so that the effect of improving the ride comfort of the tire 1 may be reduced.

The width W6 of the inner middle land portion 4B is preferably 10% to 20% of the tread width TW. If the width W6 is less than 10% of the tread width TW, the stiffness of the inner middle land portion 4B is decreased, so that the effect of improving the steering stability of the tire 1 may be reduced. If the width W6 is greater than 20% of the tread width TW, the stiffness of the inner middle land portion 4B is excessively increased, so that the effect of improving the ride comfort of the tire 1 may be reduced.

The width W7 in the tire axial direction of the outer shoulder land portion 4C is preferably larger than the width W8 in the tire axial direction of the inner shoulder land portion 4D. Such an outer shoulder land portion 4C has higher stiffness than the inner shoulder land portion 4D, and allows the self-aligning torque of the tire 1 to be generated more strongly. Thus, the steering stability of the tire 1 of the present embodiment can be further improved.

The width W7 of the outer shoulder land portion 4C is preferably 15% to 25% of the tread width TW. If the width W7 is less than 15% of the tread width TW, the stiffness of the outer shoulder land portion 4C is decreased, so that the effect of improving the steering stability of the tire 1 may be reduced. If the width W7 is greater than 25% of the tread width TW, the stiffness of the outer shoulder land portion 4C is excessively increased, so that the effect of improving the ride comfort of the tire 1 may be reduced.

The width W8 of the inner shoulder land portion 4D is preferably 10% to 20% of the tread width TW. If the width W8 is less than 10% of the tread width TW, the stiffness of the inner shoulder land portion 4D is decreased, so that the effect of improving the steering stability of the tire 1 may be reduced. If the width W8 is greater than 20% of the tread width TW, the stiffness of the inner shoulder land portion 4D is excessively increased, so that the effect of improving the ride comfort of the tire 1 may be reduced.

The width W9 in the tire axial direction of the crown land portion 4E is preferably the smallest among the land portions 4. The width W9 of the crown land portion 4E is preferably 5% to 15% of the tread width TW. If the width W9 is less than 5% of the tread width TW, the stiffness of the crown land portion 4E is decreased, so that the effect of improving the steering stability of the tire 1 may be reduced. If the width W9 is greater than 15% of the tread width TW, the stiffness of the crown land portion 4E is excessively increased, so that the effect of improving the ride comfort of the tire 1 may be reduced.

Figure 2:
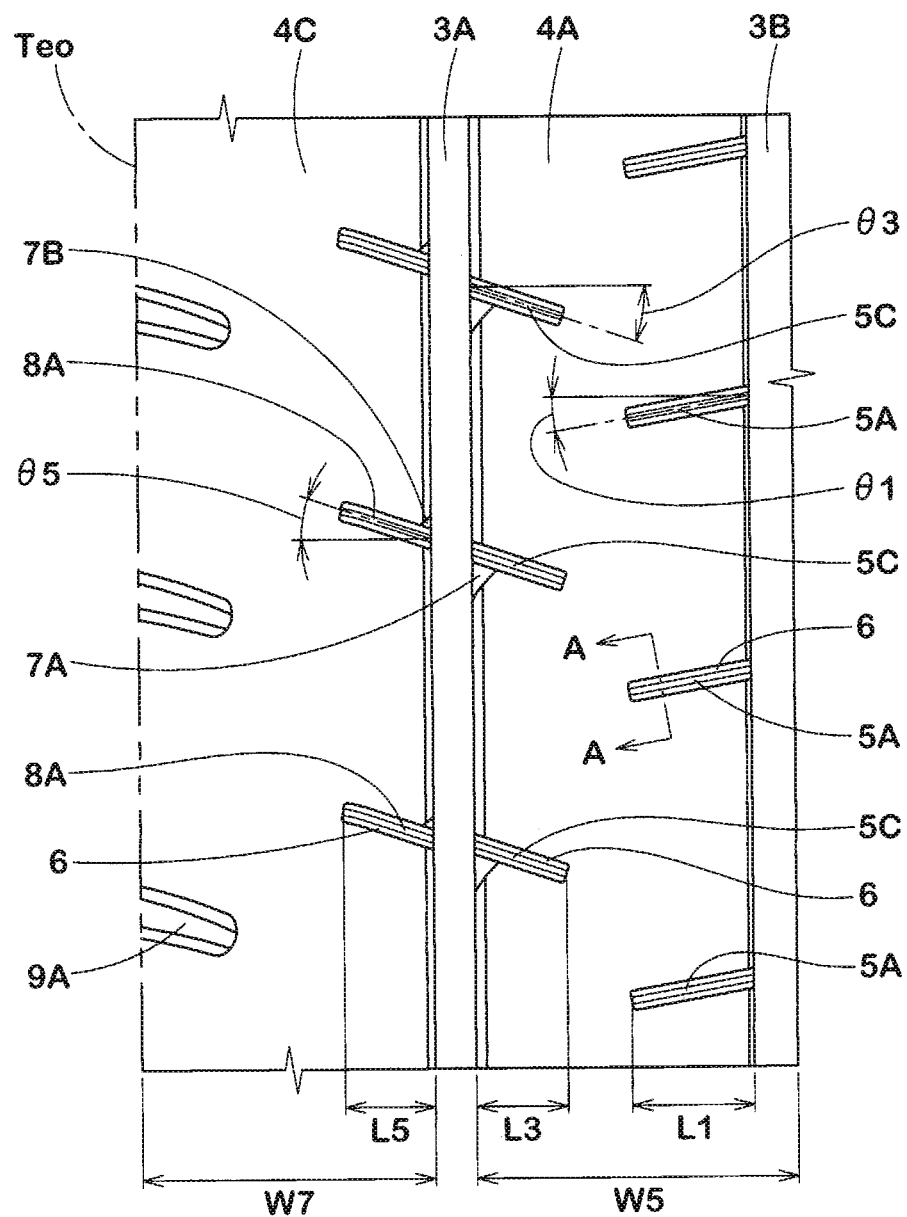
FIG. 2 is an enlarged view of an outer middle land portion and an outer shoulder land portion.

FIG. 2 is an enlarged view of the outer middle land portion 4A and the outer shoulder land portion 4C. As shown in FIG. 2, the outer middle land portion 4A of the present embodiment has the above-described first outer middle sipes 5A, and second outer middle sipes 5C that extend from the outer shoulder circumferential groove 3A toward the outer crown circumferential groove 3B and that terminate within the outer middle land portion 4A. Such an outer middle land portion 4A continuously extends in the tire circumferential direction, and thus can maintain appropriate stiffness to achieve both the steering stability and the ride comfort of the tire 1.

The angle θ1 of each first outer middle sipe 5A is preferably 5 to 15°. If the angle θ1 is less than 5°, the stiffness of the outer middle land portion 4A is not appropriately reduced, so that the effect of improving the ride comfort of the tire 1 may be reduced. If the angle θ1 is greater than 15°, the stiffness of the outer middle land portion 4A is excessively reduced, so that the effect of improving the steering stability of the tire 1 may be reduced.

The angle θ3 of each second outer middle sipe 5C with respect to the tire axial direction is preferably 15 to 25°. If the angle θ3 is less than 15°, the stiffness of the outer middle land portion 4A is not appropriately reduced, so that the effect of improving the ride comfort of the tire 1 may be reduced. If the angle θ3 is greater than 25°, the stiffness of the outer middle land portion 4A is excessively reduced, so that the effect of improving the steering stability of the tire 1 may be reduced.

The direction in which each first outer middle sipe 5A of the present embodiment is tilted relative to the tire axial direction, and the direction in which each second outer middle sipe 5C is tilted relative to the tire axial direction, are opposite to each other. Such first outer middle sipes 5A and such second outer middle sipes 5C serve to exhibit the same steering stability regardless of the rotation direction of the tire 1.

The length L1 in the tire axial direction of each first outer middle sipe 5A is preferably 30% to 50% of the width W5 of the outer middle land portion 4A. If the length L1 is less than 30% of the width W5, the stiffness of the outer middle land portion 4A is not appropriately reduced, so that the effect of improving the ride comfort of the tire 1 may be reduced. If the length L1 is greater than 50% of the width W5, the stiffness of the outer middle land portion 4A is excessively reduced, so that the effect of improving the steering stability of the tire 1 may be reduced.

The length L3 in the tire axial direction of each second outer middle sipe 5C is preferably 20% to 40% of the width W5 of the outer middle land portion 4A. If the length L3 is less than 20% of the width W5, the stiffness of the outer middle land portion 4A is not appropriately reduced, so that the effect of improving the ride comfort of the tire 1 may be reduced. If the length L3 is greater than 40% of the width W5, the stiffness of the outer middle land portion 4A is excessively reduced, so that the effect of improving the steering stability of the tire 1 may be reduced.

The length L3 of each second outer middle sipe 5C is preferably smaller than the length L1 of each first outer middle sipe 5A. With such first outer middle sipes 5A and such second outer middle sipes 5C, when the tire 1 is mounted on the vehicle, the stiffness of the outer middle land portion 4A is higher at the outer side of the vehicle than at the inner side of the vehicle, so that the self-aligning torque of the tire 1 can be generated more strongly. Thus, the steering stability of the tire 1 of the present embodiment can be further improved.

Figure 3:
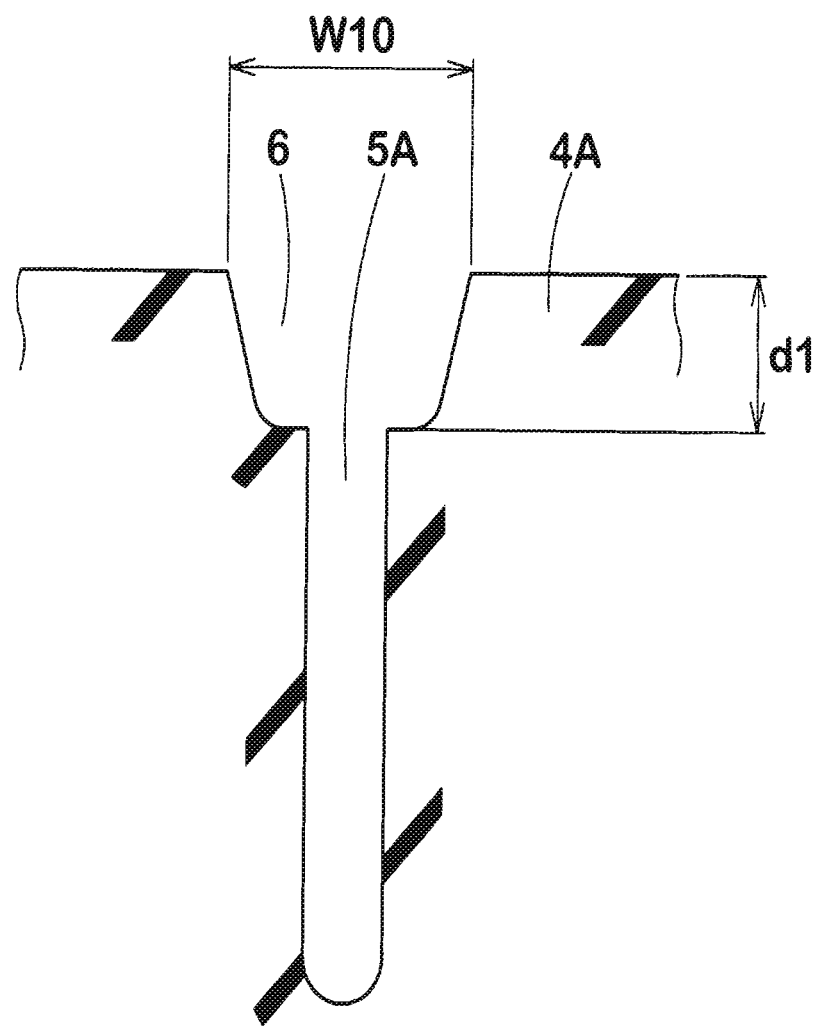
FIG. 3 is a cross-sectional view taken along a line A-A in FIG. 2.

FIG. 3 is a cross-sectional view taken along a line A-A in FIG. 2. As shown in FIGS. 2 and 3, the outer middle land portion 4A preferably has a shallow groove portion 6 that has a large groove width W10 and that is formed at the outer side in the tire radial direction of each first outer middle sipe 5A. The groove width W10 of the shallow groove portion 6 is preferably 2 to 4 mm. The depth d1 of the shallow groove portion 6 is preferably 1 to 3 mm.

As shown in FIG. 2, the outer middle land portion 4A of the present embodiment has a shallow groove portion 6 that is formed at the outer side in the tire radial direction of each second outer middle sipe 5C and that is the same as that at each first outer middle sipe 5A. Such shallow groove portions 6 can improve the drainage performance of the outer middle land portion 4A to improve the wet performance of the tire 1.

Figure 4:
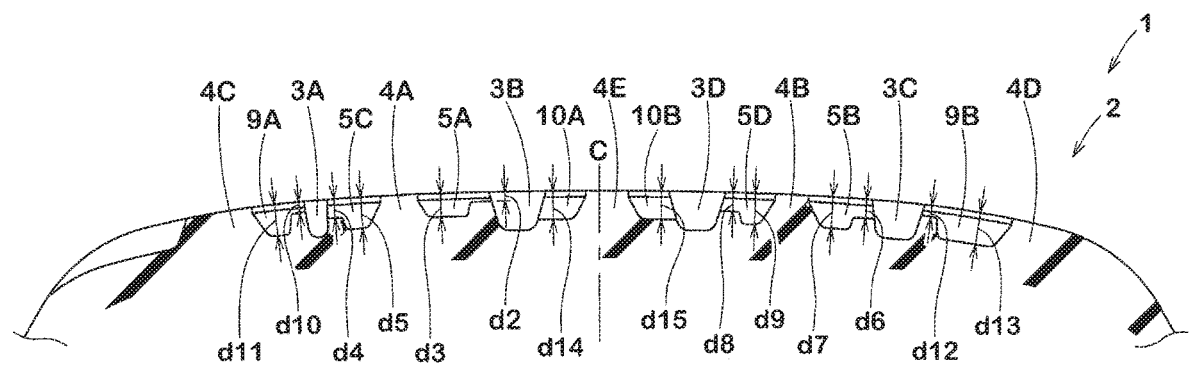
FIG. 4 is a cross-sectional view taken along a line B-B in FIG. 1.

FIG. 4 is a cross-sectional view taken along a line B-B in FIG. 1. As shown in FIG. 4, each first outer middle sipe 5A of the present embodiment has a depth d2 at the outer crown circumferential groove 3B side smaller than the maximum depth d3 of the first outer middle sipe 5A. Each second outer middle sipe 5C of the present embodiment has a depth d4 at the outer shoulder circumferential groove 3A side smaller than the maximum depth d5 of the second outer middle sipe 5C. Such first outer middle sipes 5A and such second outer middle sipes 5C do not excessively reduce the stiffness of the outer middle land portion 4A and can achieve both the steering stability and the ride comfort of the tire 1.

As shown in FIG. 2, each second outer middle sipe 5C of the present embodiment has a first chamfered portion 7A formed at an acute corner portion formed by the second outer middle sipe 5C and the outer shoulder circumferential groove 3A. Such a first chamfered portion 7A can inhibit uneven wear or chipping of the acute corner portion to improve the durability of the tire 1.

Figure 5:
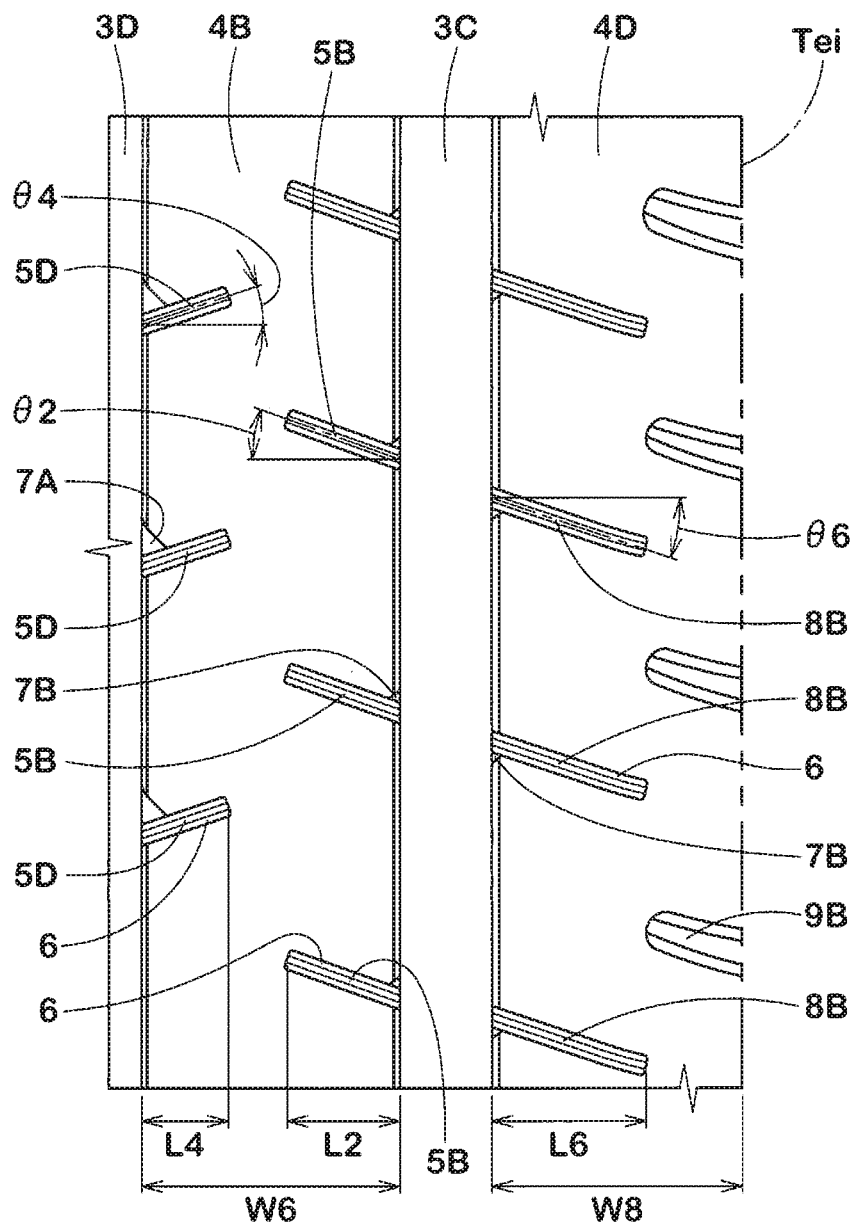
FIG. 5 is an enlarged view of an inner middle land portion and an inner shoulder land portion.

FIG. 5 is an enlarged view of the inner middle land portion 4B and the inner shoulder land portion 4D. As shown in FIG. 5, the inner middle land portion 4B of the present embodiment has the above-described first inner middle sipes 5B, and second inner middle sipes 5D that extend from the inner crown circumferential groove 3D toward the inner shoulder circumferential groove 3C and that terminate within the inner middle land portion 4B. Such an inner middle land portion 4B continuously extends in the tire circumferential direction, and thus can maintain appropriate stiffness to achieve both the steering stability and the ride comfort of the tire 1.

The angle θ2 of each first inner middle sipe 5B is preferably 15 to 25°. If the angle θ2 is less than 15°, the stiffness of the inner middle land portion 4B is not appropriately reduced, so that the effect of improving the ride comfort of the tire 1 may be reduced. If the angle θ2 is greater than 25°, the stiffness of the inner middle land portion 4B is excessively reduced, so that the effect of improving the steering stability of the tire 1 may be reduced.

The angle θ4 of each second inner middle sipe 5D with respect to the tire axial direction is preferably 15 to 25°. If the angle θ4 is less than 15°, the stiffness of the inner middle land portion 4B is not appropriately reduced, so that the effect of improving the ride comfort of the tire 1 may be reduced. If the angle θ4 is greater than 25°, the stiffness of the inner middle land portion 4B is excessively reduced, so that the effect of improving the steering stability of the tire 1 may be reduced.

The direction in which each first inner middle sipe 5B of the present embodiment is tilted relative to the tire axial direction, and the direction in which each second inner middle sipe 5D is tilted relative to the tire axial direction, are opposite to each other. Such first inner middle sipes 5B and such second inner middle sipes 5D serve to exhibit the same steering stability regardless of the rotation direction of the tire 1.

As shown in FIG. 1, the direction in which each first outer middle sipe 5A of the present embodiment is tilted relative to the tire axial direction, and the direction in which each first inner middle sipe 5B is tilted relative to the tire axial direction, are opposite to each other. Such first outer middle sipes 5A and such first inner middle sipes 5B serve to exhibit the same steering stability regardless of the rotation direction of the tire 1.

As shown in FIG. 5, the length L2 in the tire axial direction of each first inner middle sipe 5B is preferably 30% to 50% of the width W6 of the inner middle land portion 4B. If the length L2 is less than 30% of the width W6, the stiffness of the inner middle land portion 4B is not appropriately reduced, so that the effect of improving the ride comfort of the tire 1 may be reduced. If the length L2 is greater than 50% of the width W6, the stiffness of the inner middle land portion 4B is excessively reduced, so that the effect of improving the steering stability of the tire 1 may be reduced.

The length L4 in the tire axial direction of each second inner middle sipe 5D is preferably 20% to 40% of the width W6 of the inner middle land portion 4B. If the length L4 is less than 20% of the width W6, the stiffness of the inner middle land portion 4B is not appropriately reduced, so that the effect of improving the ride comfort of the tire 1 may be reduced. If the length L4 is greater than 40% of the width W6, the stiffness of the inner middle land portion 4B is excessively reduced, so that the effect of improving the steering stability of the tire 1 may be reduced.

The length L4 of each second inner middle sipe 5D is preferably smaller than the length L2 of each first inner middle sipe 5B. With such first inner middle sipes 5B and such second inner middle sipes 5D, when the tire 1 is mounted on the vehicle, the stiffness of the inner middle land portion 4B is higher at the outer side of the vehicle than at the inner side of the vehicle, so that the self-aligning torque of the tire 1 can be generated more strongly. Thus, the steering stability of the tire 1 of the present embodiment can be further improved.

The inner middle land portion 4B of the present embodiment has a shallow groove portion 6 that is formed at the outer side in the tire radial direction of each of the first inner middle sipes 5B and the second inner middle sipes 5D and that is the same as that at each first outer middle sipe 5A. Such shallow groove portions 6 can improve the drainage performance of the inner middle land portion 4B to improve the wet performance of the tire 1.

As shown in FIG. 4, each first inner middle sipe 5B of the present embodiment has a depth d6 at the inner shoulder circumferential groove 3C side smaller than the maximum depth d7 of the first inner middle sipe 5B. Each second inner middle sipe 5D of the present embodiment has a depth d8 at the inner crown circumferential groove 3D side smaller than the maximum depth d9 of the second inner middle sipe 5D. Such first inner middle sipes 5B and such second inner middle sipes 5D do not excessively reduce the stiffness of the inner middle land portion 4B and can achieve both the steering stability and the ride comfort of the tire 1.

The maximum depth d7 of each first inner middle sipe 5B of the present embodiment is larger than the maximum depth d3 of each first outer middle sipe 5A. The maximum depth d3 of each first outer middle sipe 5A is preferably smaller than each of the maximum depths of the first inner middle sipes 5B, the second outer middle sipes 5C, and the second inner middle sipes 5D. Such first outer middle sipes 5A and such first inner middle sipes 5B can make the stiffness of the outer middle land portion 4A higher than the stiffness of the inner middle land portion 4B, and thus the self-aligning torque of the tire 1 can be generated more strongly. Therefore, the steering stability of the tire 1 of the present embodiment can be further improved.

As shown in FIG. 5, each first inner middle sipe 5B of the present embodiment has a second chamfered portion 7B formed at an acute corner portion formed by the first inner middle sipe 5B and the inner shoulder circumferential groove 3C. Each second inner middle sipe 5D of the present embodiment has a first chamfered portion 7A formed at an acute corner portion formed by the second inner middle sipe 5D and the inner crown circumferential groove 3D. The first chamfered portion 7A is preferably larger than the second chamfered portion 7B.

Such a first chamfered portion 7A and such a second chamfered portion 7B each can inhibit uneven wear or chipping of the acute corner portion to improve the durability of the tire 1. In addition, since the first chamfered portion 7A is larger than the second chamfered portion 7B, even if great external force act during turning, uneven wear or chipping of the acute corner portion can be inhibited.

As shown in FIG. 1, the total number N1 of the first outer middle sipes 5A of the present embodiment in the tire circumferential direction is smaller than the total number N2 of the first inner middle sipes 5B in the tire circumferential direction. With such an outer middle land portion 4A and such an inner middle land portion 4B, the stiffness of the outer middle land portion 4A is higher than the stiffness of the inner middle land portion 4B, and thus the self-aligning torque of the tire 1 can be generated more strongly. Therefore, the steering stability of the tire 1 of the present embodiment can be further improved.

The total number N1 of the first outer middle sipes 5A is preferably 60 to 70. If the total number N1 is less than 60, the stiffness of the outer middle land portion 4A is not appropriately reduced, so that the effect of improving the ride comfort of the tire 1 may be reduced. If the total number N1 is greater than 70, the stiffness of the outer middle land portion 4A is excessively reduced, so that the effect of improving the steering stability of the tire 1 may be reduced.

The total number N2 of the first inner middle sipes 5B is preferably 70 to 80. If the total number N2 is less than 70, the stiffness of the inner middle land portion 4B is not appropriately reduced, so that the effect of improving the ride comfort of the tire 1 may be reduced. If the total number N2 is greater than 80, the stiffness of the inner middle land portion 4B is excessively reduced, so that the effect of improving the steering stability of the tire 1 may be reduced.

The difference between the total number N1 of the first outer middle sipes 5A and the total number N2 of the first inner middle sipes 5B is preferably 5 to 15. If the difference between the total number N1 and the total number N2 is less than 5, the stiffness difference between the outer middle land portion 4A and the inner middle land portion 4B is decreased, so that the effect of improving the steering stability of the tire 1 may be reduced. If the difference between the total number N1 and the total number N2 is greater than 15, the stiffness difference between the outer middle land portion 4A and the inner middle land portion 4B is excessively increased, and the stiffness balance is reduced, so that the effect of improving the steering stability of the tire 1 may be reduced.

As shown in FIG. 2, the outer shoulder land portion 4C of the present embodiment has outer shoulder sipes 8A that extend from the outer shoulder circumferential groove 3A toward the outer tread edge Teo and that terminate within the outer shoulder land portion 4C. In addition, the outer shoulder land portion 4C preferably has outer shoulder lateral grooves 9A that extend from the outer tread edge Teo toward the outer shoulder circumferential groove 3A and that terminate within the outer shoulder land portion 4C. Such an outer shoulder land portion 4C continuously extends in the tire circumferential direction, and thus can maintain appropriate stiffness to achieve both the steering stability and the ride comfort of the tire 1.

The angle θ5 of each outer shoulder sipe 8A with respect to the tire axial direction is preferably 15 to 25°. If the angle θ5 is less than 15°, the stiffness of the outer shoulder land portion 4C is not appropriately reduced, so that the effect of improving the ride comfort of the tire 1 may be reduced. If the angle θ5 is greater than 25°, the stiffness of the outer shoulder land portion 4C is excessively reduced, so that the effect of improving the steering stability of the tire 1 may be reduced.

The direction in which each outer shoulder sipe 8A is tilted relative to the tire axial direction, and the direction in which each second outer middle sipe 5C is tilted relative to the tire axial direction, are preferably the same. Such outer shoulder sipes 8A, in cooperation with the second outer middle sipes 5C, can reduce the stiffness difference between the outer shoulder land portion 4C and the outer middle land portion 4A to improve the ride comfort of the tire 1.

The length L5 in the tire axial direction of each outer shoulder sipe 8A is preferably 20% to 40% of the width W7 of the outer shoulder land portion 4C. If the length L5 is less than 20% of the width W7, the stiffness of the outer shoulder land portion 4C is not appropriately reduced, so that the effect of improving the ride comfort of the tire 1 may be reduced. If the length L5 is greater than 40% of the width W7, the stiffness of the outer shoulder land portion 4C is excessively reduced, so that the effect of improving the steering stability of the tire 1 may be reduced.

The outer shoulder sipes 8A and the outer shoulder lateral grooves 9A are preferably separated from each other in the tire axial direction. Such an outer shoulder land portion 4C can enhance the stiffness at the outer side of the vehicle when the tire 1 is mounted on the vehicle, to allow the self-aligning torque of the tire 1 to be generated more strongly. Thus, the steering stability of the tire 1 of the present embodiment can be further improved.

The outer shoulder land portion 4C of the present embodiment has a shallow groove portion 6 that is formed at the outer side in the tire radial direction of each outer shoulder sipe 8A and that is the same as that at each first outer middle sipe 5A. Such shallow groove portions 6 can improve the drainage performance of the outer shoulder land portion 4C to improve the wet performance of the tire 1.

As shown in FIG. 4, each outer shoulder sipe 8A of the present embodiment has a depth d10 at the outer shoulder circumferential groove 3A side smaller than the maximum depth d11 of the outer shoulder sipe 8A. Such outer shoulder sipes 8A do not excessively reduce the stiffness of the outer shoulder land portion 4C and can achieve both the steering stability and the ride comfort of the tire 1.

As shown in FIG. 2, each outer shoulder sipe 8A of the present embodiment has a second chamfered portion 7B formed at an acute corner portion formed by the outer shoulder sipe 8A and the outer shoulder circumferential groove 3A. Such a second chamfered portion 7B can inhibit uneven wear or chipping of the acute corner portion to improve the durability of the tire 1.

As shown in FIG. 5, the inner shoulder land portion 4D of the present embodiment has inner shoulder sipes 8B that extend from the inner shoulder circumferential groove 3C toward the inner tread edge Tei and that terminate within the inner shoulder land portion 4D. In addition, the inner shoulder land portion 4D preferably has inner shoulder lateral grooves 9B that extend from the inner tread edge Tei toward the inner shoulder circumferential groove 3C and that terminate within the inner shoulder land portion 4D. Such an inner shoulder land portion 4D continuously extends in the tire circumferential direction, and thus can maintain appropriate stiffness to achieve both the steering stability and the ride comfort of the tire 1.

The angle θ6 of each inner shoulder sipe 8B with respect to the tire axial direction is preferably 15 to 25°. If the angle θ6 is less than 15°, the stiffness of the inner shoulder land portion 4D is not appropriately reduced, so that the effect of improving the ride comfort of the tire 1 may be reduced. If the angle θ6 is greater than 25°, the stiffness of the inner shoulder land portion 4D is excessively reduced, so that the effect of improving the steering stability of the tire 1 may be reduced.

The direction in which each inner shoulder sipe 8B is tilted relative to the tire axial direction is preferably the same as the direction in which each first inner middle sipe 5B is tilted relative to the tire axial direction. Such inner shoulder sipes 8B, in cooperation with the first inner middle sipes 5B, can reduce the stiffness difference between the inner shoulder land portion 4D and the inner middle land portion 4B to improve the ride comfort of the tire 1.

The length L6 in the tire axial direction of each inner shoulder sipe 8B is preferably 50% to 70% of the width W8 of the inner shoulder land portion 4D. If the length L6 is less than 50% of the width W8, the stiffness of the inner shoulder land portion 4D is not appropriately reduced, so that the effect of improving the ride comfort of the tire 1 may be reduced. If the length L6 is greater than 70% of the width W8, the stiffness of the inner shoulder land portion 4D is excessively reduced, so that the effect of improving the steering stability of the tire 1 may be reduced.

The length L6 of each inner shoulder sipe 8B is preferably larger than the length L5 of each outer shoulder sipe 8A. That is, the length L5 of each outer shoulder sipe 8A of the present embodiment is smaller than the length L6 of each inner shoulder sipe 8B. Such outer shoulder sipes 8A and such inner shoulder sipes 8B can make the stiffness of the outer middle land portion 4A higher than the stiffness of the inner middle land portion 4B, and thus the self-aligning torque of the tire 1 can be generated more strongly. Therefore, the steering stability of the tire 1 of the present embodiment can be further improved.

The inner shoulder sipes 8B and the inner shoulder lateral grooves 9B preferably overlap each other in the tire axial direction. Such an inner shoulder land portion 4D can cause a stiffness difference between the outer side of the vehicle and the inner side of the vehicle when the tire 1 is mounted on the vehicle, to allow the self-aligning torque of the tire 1 to be generated more strongly. Thus, the steering stability of the tire 1 of the present embodiment can be further improved.

The inner shoulder land portion 4D of the present embodiment has a shallow groove portion 6 that is formed at the outer side in the tire radial direction of each inner shoulder sipe 8B and that is the same as that at each first outer middle sipe 5A. Such shallow groove portions 6 can improve the drainage performance of the inner shoulder land portion 4D to improve the wet performance of the tire 1.

As shown in FIG. 4, each inner shoulder sipe 8B of the present embodiment has a depth d12 at the inner shoulder circumferential groove 3C side smaller than the maximum depth d13 of the inner shoulder sipe 8B. Such inner shoulder sipes 8B do not excessively reduce the stiffness of the inner shoulder land portion 4D and can achieve both the steering stability and the ride comfort of the tire 1.

As shown in FIG. 5, each inner shoulder sipe 8B of the present embodiment has a second chamfered portion 7B formed at an acute corner portion formed by the inner shoulder sipe 8B and the inner shoulder circumferential groove 3C. Such a second chamfered portion 7B can inhibit uneven wear or chipping of the acute corner portion to improve the durability of the tire 1.

Figure 6:
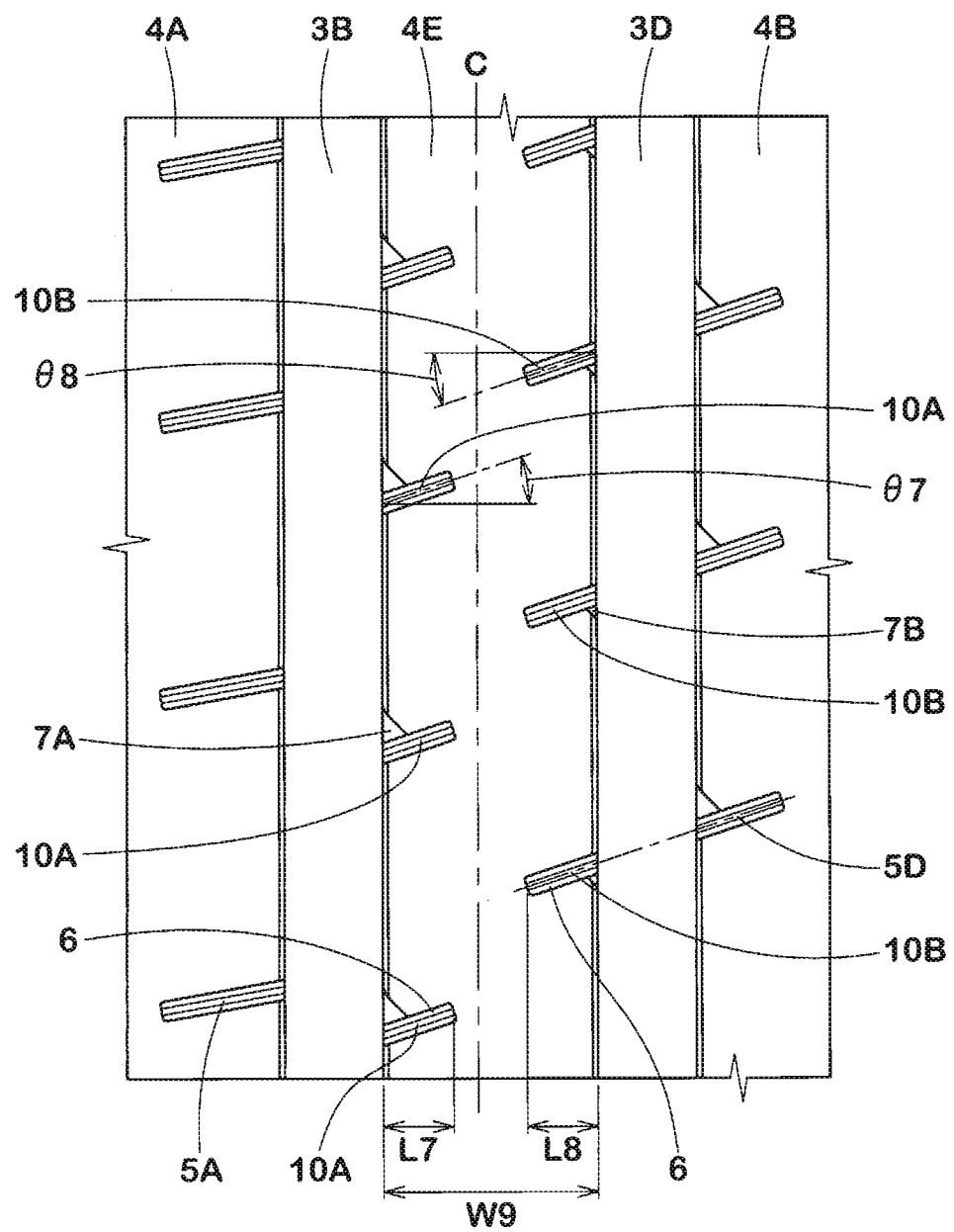
FIG. 6 is an enlarged view of a crown land portion.

FIG. 6 is an enlarged view of the crown land portion 4E. As shown in FIG. 6, the crown land portion 4E of the present embodiment has outer crown sipes 10A located at the outer side of the vehicle with respect to the tire equator C when the tire 1 is mounted on the vehicle, and inner crown sipes 10B located at the inner side of the vehicle with respect to the tire equator C when the tire 1 is mounted on the vehicle, and the outer crown sipes 10A and the inner crown sipes 10B are alternately provided in the tire circumferential direction.

Each outer crown sipe 10A preferably extends from the outer crown circumferential groove 3B toward the tire equator C and terminates within the crown land portion 4E without crossing the tire equator C. Each inner crown sipe 10B preferably extends from the inner crown circumferential groove 3D toward the tire equator C and terminates within the crown land portion 4E without crossing the tire equator C. Such a crown land portion 4E continuously extends in the tire circumferential direction, and thus can maintain appropriate stiffness to achieve both the steering stability and the ride comfort of the tire 1.

The angle θ7 of each outer crown sipe 10A with respect to the tire axial direction is preferably 15 to 25°. If the angle θ7 is less than 15°, the stiffness of the crown land portion 4E is not appropriately reduced, so that the effect of improving the ride comfort of the tire 1 may be reduced. If the angle θ7 is greater than 25°, the stiffness of the crown land portion 4E is excessively reduced, so that the effect of improving the steering stability of the tire 1 may be reduced.

The direction in which each outer crown sipe 10A is tilted relative to the tire axial direction is preferably the same as the direction in which each first outer middle sipe 5A is tilted relative to the tire axial direction. Such outer crown sipes 10A, in cooperation with the first outer middle sipes 5A, can reduce the stiffness difference between the crown land portion 4E and the outer middle land portion 4A to improve the ride comfort of the tire 1.

The angle θ8 of each inner crown sipe 10B with respect to the tire axial direction is preferably 15 to 25°. If the angle θ8 is less than 15°, the stiffness of the crown land portion 4E is not appropriately reduced, so that the effect of improving the ride comfort of the tire 1 may be reduced. If the angle θ8 is greater than 25°, the stiffness of the crown land portion 4E is excessively reduced, so that the effect of improving the steering stability of the tire 1 may be reduced.

The direction in which each inner crown sipe 10B is tilted relative to the tire axial direction is preferably the same as the direction in which each second inner middle sipe 5D is tilted relative to the tire axial direction. Each inner crown sipe 10B and each second inner middle sipe 5D of the present embodiment are located so as to form a straight line across the inner crown circumferential groove 3D. Such inner crown sipes 10B, in cooperation with the second inner middle sipes 5D, can reduce the stiffness difference between the crown land portion 4E and the inner middle land portion 4B to improve the ride comfort of the tire 1.

The length L7 in the tire axial direction of each outer crown sipe 10A is preferably 20% to 40% of the width W9 of the crown land portion 4E. If the length L7 is less than 20% of the width W9, the stiffness of the crown land portion 4E is not appropriately reduced, so that the effect of improving the ride comfort of the tire 1 may be reduced. If the length L7 is greater than 40% of the width W9, the stiffness of the crown land portion 4E is excessively reduced, so that the effect of improving the steering stability of the tire 1 may be reduced.

The length L8 in the tire axial direction of each inner crown sipe 10B is preferably 20% to 40% of the width W9 of the crown land portion 4E. If the length L8 is less than 20% of the width W9, the stiffness of the crown land portion 4E is not appropriately reduced, so that the effect of improving the ride comfort of the tire 1 may be reduced. If the length L8 is greater than 40% of the width W9, the stiffness of the crown land portion 4E is excessively reduced, so that the effect of improving the steering stability of the tire 1 may be reduced.

The crown land portion 4E of the present embodiment has a shallow groove portion 6 that is formed at the outer side in the tire radial direction of each of the outer crown sipes 10A and the inner crown sipes 10B and that is the same as that at each first outer middle sipe 5A. Such shallow groove portions 6 can improve the drainage performance of the crown land portion 4E to improve the wet performance of the tire 1.

As shown in FIG. 4, each outer crown sipe 10A and each inner crown sipe 10B of the present embodiment have substantially uniform maximum depths d14 and d15, respectively. The maximum depth d14 of each outer crown sipe 10A is preferably substantially equal to the maximum depth d15 of each inner crown sipe 10B. Such outer crown sipes 10A and such inner crown sipes 10B can reduce the stiffness of the crown land portion 4E in a well-balanced manner and can achieve both the steering stability and the ride comfort of the tire 1.

As shown in FIG. 6, each outer crown sipe 10A of the present embodiment has a first chamfered portion 7A formed at an acute corner portion formed by the outer crown sipe 10A and the outer crown circumferential groove 3B. In addition, each inner crown sipe 10B of the present embodiment has a second chamfered portion 7B formed at an acute corner portion formed by the inner crown sipe 10B and the inner crown circumferential groove 3D. In such a crown land portion 4E, uneven wear or chipping of the acute corner portion can be inhibited, thereby improving the durability of the tire 1.

Although the particularly preferred embodiment of the present invention has been described in detail above, the present invention is not limited to the above-described embodiment, and various modifications can be made to practice the present invention.

EXAMPLES

Tires having the basic pattern in FIG. 1 were produced as test tires on the basis of specifications in Tables 1 and 2. Each test tire was tested for steering stability and ride comfort. The common specifications and the test methods for all the test tires are as follows.

Tire size: 205/55R16
Rim size: 16×6.5JJ
Air pressure: 230 kPa
Test vehicle: a front-wheel-drive car having an engine displacement of 2000 cc Tire mounted position: all wheels <Steering Stability>

One test driver got on the test vehicle, drove the test vehicle on a dry road surface, and made sensory evaluation for steering stability achieved when the test vehicle was driven. The results are represented by indexes with the result of a comparative example being regarded as 100. A higher numerical value indicates that the steering stability is better.

<Ride Comfort>

One test driver got on the test vehicle, drove the test vehicle on a dry road surface, and made sensory evaluation for ride comfort achieved when the test vehicle was driven. The results are represented by indexes with the result of the comparative example being regarded as 100. A higher numerical value indicates that the ride comfort is better.

The results of the tests are shown in Tables 1 and 2.

TABLE 1

|  | Comp. Ex. | Ex. 1 | Ex. 2 | Ex. 3 | Ex. 4 | Ex. 5 |
|---|---|---|---|---|---|---|
| Angle θ1 of first outer middle sipe (°) | 18 | 10 | 1 | 17 | 10 | 10 |
| Angle θ2 of first inner middle sipe (°) | 18 | 20 | 20 | 20 | 12 | 27 |
| Total number N1 of first outer middle sipes | 70 | 66 | 66 | 66 | 66 | 66 |
| Total number N2 of first inner middle sipes | 70 | 74 | 74 | 74 | 74 | 74 |
| Difference (N2 − N1) between total number N1 and total number N2 | 0 | 8 | 8 | 8 | 8 | 8 |
| Steering stability (index) | 100 | 120 | 120 | 110 | 120 | 115 |
| Ride comfort (index) | 100 | 105 | 100 | 105 | 100 | 105 |

TABLE 2

|  | Ex. 6 | Ex. 7 | Ex. 8 | Ex. 9 | Ex. 10 | Ex. 11 |
|---|---|---|---|---|---|---|
| Angle θ1 of first outer middle sipe (°) | 10 | 10 | 10 | 10 | 10 | 10 |
| Angle θ2 of first inner middle sipe (°) | 20 | 20 | 20 | 20 | 20 | 20 |
| Total number N1 of first outer middle sipes | 55 | 70 | 75 | 66 | 66 | 66 |
| Total number N2 of first inner middle sipes | 74 | 74 | 74 | 65 | 80 | 85 |
| Difference (N2 − N1) between total number N1 and total number N2 | 19 | 4 | −1 | 1 | 14 | 19 |
| Steering stability (index) | 115 | 110 | 105 | 120 | 115 | 110 |
| Ride comfort (index) | 100 | 105 | 105 | 100 | 110 | 110 |

As a result of the tests, it was confirmed that the tires of the examples achieve both steering stability and ride comfort at high levels in a well-balanced manner as compared to the comparative example.

What is claimed is:

1. A tire comprising:
a tread portion having a designated mounting direction to a vehicle,
wherein the tread portion includes an outer middle land portion, which is delimited between an outer shoulder circumferential groove and an outer crown circumferential groove, positionable at an outer side of the vehicle when the tire is mounted on the vehicle, and an inner middle land portion, which is delimited between an inner shoulder circumferential groove and an inner crown circumferential groove, positionable at an inner side of the vehicle when the tire is mounted on the vehicle,
wherein the outer middle land portion has first outer middle sipes extending from the outer crown circumferential groove toward the outer shoulder circumferential groove and terminating within the outer middle land portion,
wherein the inner middle land portion has first inner middle sipes extending from the inner shoulder circumferential groove toward the inner crown circumferential groove and terminating within the inner middle land portion,
wherein an angle of each of the first outer middle sipes with respect to a tire axial direction is smaller than an angle of each of the first inner middle sipes with respect to the tire axial direction, and
wherein a stiffness of the outer middle land portion is greater than a stiffness of the inner middle land portion;
the tread portion includes an outer shoulder land portion delimited between the outer shoulder circumferential groove and an outer tread edge, and an inner shoulder land portion delimited between the inner shoulder circumferential groove and an inner tread edge,
wherein the outer shoulder land portion has a width in the tire axial direction larger than a width in the tire axial direction of the inner shoulder land portion;
outer shoulder sipes extending into the outer shoulder land portion from the outer shoulder circumferential groove and terminating within the outer shoulder land portion;
outer shoulder lateral grooves extending into the outer shoulder land portion from the outer tread edge and terminating within the outer shoulder land portion;
inner shoulder sipes extending into the inner shoulder land portion from the inner shoulder circumferential groove and terminating within the inner shoulder land portion; and
inner shoulder lateral grooves extending into the inner shoulder land portion from the inner tread edge and terminating within the inner shoulder land portion,
wherein the outer shoulder sipes and the outer shoulder lateral grooves are separated from each other in the axial direction, and
wherein the inner shoulder sipes and the inner shoulder lateral grooves overlap each other in the axial direction.

2. The tire according to claim 1, wherein the angle of each of the first outer middle sipes is 5 to 15°, and
wherein the angle of each of the first inner middle sipes is 15 to 25°.

3. The tire according to claim 1, wherein a direction in which each of the first outer middle sipes is tilted relative to the tire axial direction and a direction in which each of the first inner middle sipes is tilted relative to the tire axial direction are opposite to each other.

4. The tire according to claim 1, wherein the width of the outer shoulder land portion is 15% to 25% of a tread width of the tread portion, and
wherein the width of the inner shoulder land portion is 10% to 20% of the tread width.

5. The tire according to claim 1, wherein each of the outer middle land portion, the inner middle land portion, the outer shoulder land portion, and the inner shoulder land portion is continuous in a tire circumferential direction.

6. The tire according to claim 1, wherein a length in the tire axial direction of each first outer middle sipe is 30% to 50% of a width in the axial direction of the outer middle land portion.

7. The tire according to claim 1, wherein the outer middle land portion further has second outer middle sipes extending from the outer shoulder circumferential groove toward the outer crown circumferential groove and terminating within the outer middle land portion,
wherein a direction in which each first outer middle sipe is tilted relative to the tire axial direction and a direction in which each second outer middle sipe is tilted relative to the tire axial direction is opposite to each other,
wherein a length in the tire axial direction of each second outer middle sipe is 20% to 40% of a width in the axial direction of the outer middle land portion, and
wherein the length of each second outer middle sipe is smaller than a length of each first outer middle sipe in the axial direction.

8. The tire according to claim 1, wherein the outer middle land portion has a shallow groove portion that is formed at an outer side in the tire radial direction of each first outer middle sipe, and
wherein a groove width of the shallow groove portion is 2 to 4 mm.

9. The tire according to claim 1, wherein a length in the tire axial direction of each first inner middle sipe is 30% to 50% of a width in the axial direction of the inner middle land portion.

10. The tire according to claim 1, wherein at least the outer shoulder circumferential groove and the inner shoulder circumferential groove each continuously extend in the circumferential direction in a straight manner.

11. The tire according to claim 1, wherein a width of the outer shoulder circumferential groove is smaller than a width of the inner shoulder circumferential groove.

12. The tire according to claim 1, wherein a total number of the first outer middle sipes in a tire circumferential direction is smaller than a total number of the first inner middle sipes in the tire circumferential direction.

13. The tire according to claim 12, wherein the total number of the first outer middle sipes is 60 to 70, and
wherein the total number of the first inner middle sipes is 70 to 80.

14. The tire according to claim 12, wherein a difference between the total number of the first outer middle sipes and the total number of the first inner middle sipes is 5 to 15.

15. The tire according to claim 1, wherein the outer shoulder land portion has outer shoulder sipes extending from the outer shoulder circumferential groove toward the outer tread edge and terminating within the outer shoulder land portion,
wherein the inner shoulder land portion has inner shoulder sipes extending from the inner shoulder circumferential groove toward the inner tread edge terminating within the inner shoulder land portion, and
wherein each of the outer shoulder sipes has a length in the tire axial direction smaller than a length of each of the inner shoulder sipes in the tire axial direction.

16. The tire according to claim 15, wherein the length of each of the outer shoulder sipes is 20% to 40% of the width of the outer shoulder land portion, and
wherein the length of each of the inner shoulder sipes is 50% to 70% of the width of the inner shoulder land portion.

17. The tire according to claim 1, the tread portion further comprising a crown land portion delimited between the outer crown circumferential groove and the inner crown circumferential groove,
wherein the crown land portion has inner crown sipes extending from the inner crown circumferential groove toward a tire equator and terminating within the crown land portion,
wherein the inner middle land portion has second inner middle sipes extending from the inner crown circumferential groove toward the inner shoulder circumferential groove and terminating within the inner middle land portion, and
wherein the inner crown sipes and the second inner middle sipes are located so as to form straight lines across the inner crown circumferential groove.

18. The tire according to claim 17, wherein a length in the tire axial direction of each second inner middle sipe is 20% to 40% of a width in the axial direction of the inner middle land portion, and
wherein the length of each second inner middle sipe is smaller than a length of each first inner middle sipe in the tire axial direction.

* * * * *